Sept. 19, 1961 R. T. KEMPER 3,000,433
THERMAL INSULATION FOR PIPE
Filed Nov. 7, 1956
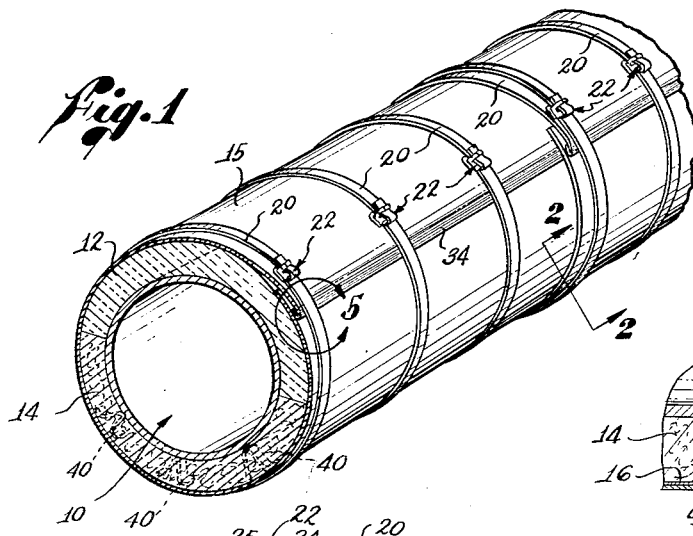
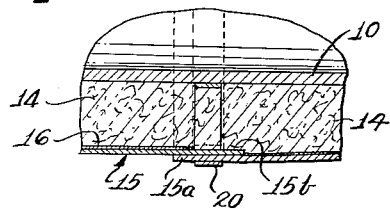
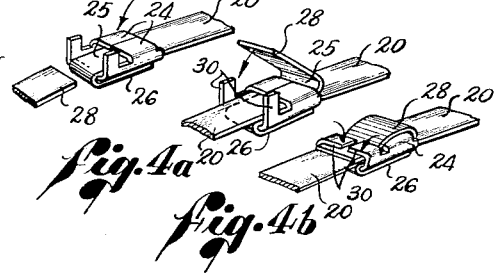
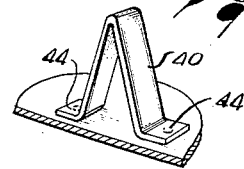
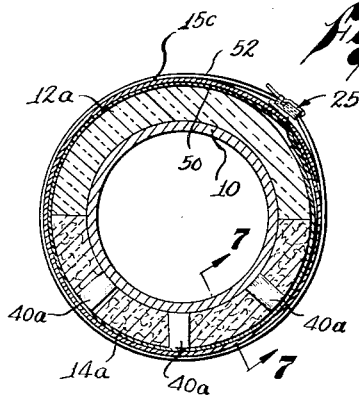
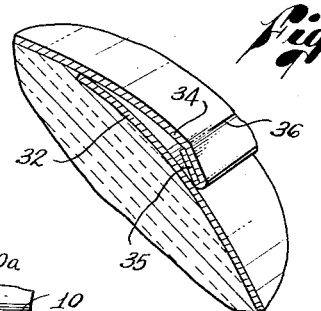
INVENTOR.
RAY T. KEMPER
BY
Attorney United States Patent Office 3,000,433
Patented Sept. 19, 1961

3,000,433
THERMAL INSULATION FOR PIPE
Ray T. Kemper, Los Angeles County, Calif.
(21759 Western Ave., Torrance, Calif.)
Filed Nov. 7, 1956, Ser. No. 620,852
12 Claims. (Cl. 154—28)

This invention relates to insulation for retarding heat flow from or to horizontal, hollow cylindrical bodies containing heated or cooled fluids, such as pipes for transporting various fluids and receptacles used for storing or processing various fluids.

The invention has the multiple purposes of providing an encasing insulation structure that is highly efficient with respect to retardation of heat flow and will maintain its effectiveness indefinitely; that is economical in combined material and installation cost; that has a pleasing appearance reflecting pride in workmanship; and that can be depended upon to maintain its installed dimensions and configuration throughout its service life. It is not difficult to attain some of these purposes if the other purposes are completely disregarded, but the broad object of the invention is to attain an optimum combination of all of these purposes in a single insulating structure, no one of the specified purposes being seriously compromised for the sake of the others.

It is well known that an effective insulation of low material cost may be provided by using suitable loose, fibrous insulating material encased in a jacket of paper or cloth and bound by spaced hoops of wire. Such an insulation structure, however, involves considerable installation labor, has a poor appearance from the start, depreciates materially with the passing of time, and is too easily damaged and changed in configuration with consequent drop in its insulating effectiveness.

It is also well known that an insulating structure may comprise solely preformed, fitted slabs of high compressive strength encased in a suitable jacket. Such a construction is of high thermal efficiency and has a pleasing appearance as well as a long service life at a low rate of depreciation. The serious disadvantage, however, is that such a construction is excessively costly.

Generally described, the broad object of the invention with respect to the multiple purposes is attained by using two kinds of insulating material in an enclosing jacket of suitable sheet material. On the upper side of the horizontal pipe or receptacle, self-supporting, form-retaining insulating material is used in the form of slabs or blocks having a compressive strength of several pounds per square inch. On the underside of the pipe or receptacle, a loose, fibrous, highly efficient insulating material is employed that is not self-supporting, not form-retaining and is not capable of withstanding compression loads of substantially more than one pound per square inch.

In the preferred practice of the invention, the insulating material of high compressive strength extends over the upper half of the horizontal pipe and the softer yielding insulating material extends over the lower half, with suitable radial spacers extending through the softer material from the outer jacket to the periphery of the enclosed pipe. As will be made apparent, this structure involving two types of insulating material around the periphery of a horizontal pipe or receptacle has high insulating efficiency and yet is highly economical in combined material and labor cost. In addition, the finished structure has a pleasing appearance reflecting good workmanship, and will maintain its appearance and initial configuration in the face of various external loads and impacts encountered during its service life. As will be explained, a further advantage of this preferred practice of the invention is that the insulating structure may be largely prefabricated economically and then installed in an expeditious manner.

The various objects, features and advantages of the invention may be understood from the following detailed description considered with the accompanying drawing.

In the drawing, which is to be regarded as merely illustrative:

FIG. 1 is a view, partly in perspective and partly in section, illustrating the preferred practice of the invention for insulating a pipe containing a heated fluid;

FIG. 2 is an enlarged radial section taken as indicated by the line 2—2 of FIG. 1;

FIG. 3 is a perspective view of a radial spacer element that is used in this embodiment of the invention;

FIGS. 4, 4a and 4b are perspective views illustrating successive steps in the application of an encircling tension band used in this practice of the invention;

FIG. 5 is an enlarged detail of a portion indicated by the circular arrow 5 in FIG. 1, and showing how the longitudinal edges of the sheet material of the jacket overlap;

FIG. 6 is a sectional view illustrating a second practice of the invention for insulating a pipe or receptacle that contains a cooled fluid; and FIG. 7 is an enlarged radial section taken as indicated by the line 7—7 of FIG. 6.

In the first practice of the invention illustrated by FIGS. 1 to 5, a substantially horizontal pipe 10 that is to be insulated transports a heated fluid. The upper longitudinal portion of the pipe 10 is covered by self-supporting, form-retaining insulating slabs or blocks 12 that are preformed to fit the curvature of the pipe and have a relatively high compressive strength, the compressive strength being at least several pounds per square inch. The slabs 12 may be made of calcium silicate having a compressive strength of approximately 150 pounds per square inch, or may be 85% magnesia with a compressive strength on the order of 50 pounds per square inch, or may be of an asbestos composition having a compressive strength on the order of 5 pounds per square inch. Other types of insulating material in preformed blocks of the required resistance to compression and of the required insulating effectiveness may be employed in various practices of the invention.

It is contemplated that the relatively strong insulating slabs 12 will extend over a sufficient portion of the upper half of the pipe 10 to take loads that may be imposed on the upper side of the insulation structure; for example, the load imposed by a man standing on the insulating structure. It is deisrable, moreover, that the slabs 12 be of sufficient circumferential extent to support the cylindrical configuration of any sheet material that may be used for an outer jacket. In this particular embodiment of the invention, the circumferential extent of the slabs 12 is 180°, the slabs completely covering the upper half of the peripheral surface of the pipe 10, but it is to be understood that the circumferential extent may be more or less than 180°.

The remaining lower portion of the pipe periphery is covered by a mass of soft, porous insulating material 14 of substantially the same thickness as the slabs 12. Preferably, the insulating material 14 comprises felted fibrous glass, commonly called glass wool, the insulating material being preferably in the form of batts. Such a porous, fibrous material has exceptionally high insulating efficiency, but is neither self-supporting nor form-retaining and will yield materially under compressive loads of one pound or less per square inch. The insulating material 14 extends from one longitudinal edge of the slabs 12 to the other longitudinal edge, and thus combines with the slabs to completely enclose the pipe 10 for retardation of heat transfer from the pipe to the surrounding atmosphere.

This thick envelope comprising the upper slabs 12 and the lower insulating material 14 is confined by a cylindrical jacket 15 of suitable sheet material. The jacket 15 may be made of sheet steel or sheet aluminum or it may be made of a suitable fibrous or plastic material. In this embodiment of the invention, the jacket 15 is made of light-gauge galvanized steel. The sheet metal jacket 15 fits snugly against the outer peripheral surface of the insulating slabs 12 and is thereby effectively supported and reinforced on the upper side of the pipe 10.

As indicated in FIG. 2, the soft insulating material 14 is bonded to the inner surface of the sheet metal jacket 15 by a layer 16 of suitable adhesive material. If two superimposed batts of the glass wool are used to make up the required thickness of the layer 14, the two batts are bonded together in the same manner so that all the soft insulting material 14 is effectively united with the sheet metal jacket 15. Other types of yielding insulating material may be employed instead of glass wool and it is not essential that the insulating material 14 be bonded to the inner surface of the jacket 15. Other insulating materials that may be used include suitable organic fibers and various loose or bulk insulation material.

The sheet material forming the jacket 15 may be secured in cylindrical form in various ways in various practices of the invention. In this instance, the jacket 15 comprises sheets of metal of convenient width, say 36 inches. The sheets are wrapped around the insulating material, with marginal edges of the sheets overlapping in a manner to shed water, and the sheets are secured by suitable tension bands 20. Preferably, each tension band 20 is made of pliable noncorrosive metal secured by a well known type of fitting 22 in an manner that may be understood by reference to FIG. 4.

The fitting 22 is of sheet metal construction and is formed with a pair of tongues 24 that are bent over to meet and form a slot 25 of a width to receive a tension band 20. One end 26 of the pliable tension band is initially extended through the slot 25 and folded under, as shown. After the band is positioned to encircle the jacket 15, the other end 28 is extended through the slot 25 from the opposite direction and is folded back over the pair of tongues 24. Finally, a pair of upstanding ears 30 of the fitting 22 are bent down, as shown, against the folded band end 28.

As may be seen in FIGS. 1 and 5, the metal sheets forming the jacket 15 are wrapped around both the insulating slabs 12 and the insulating material 14 with longitudinal marginal portions of the sheet metal overlapping and with the outer marginal portion extending downward to shed water. Thus, as best shown in FIG. 5, an inner marginal portion 32 of each of the sheets of metal comprising the jacket 15 extends under an outer marginal portion 34, the outer marginal portion 34 being on the upper half of the structure and being directed downward to shed water away from the interior of the jacket.

In the preferred practice of the invention, the outer marginal portion 34 of each of the sheets that form the jacket 15 is bent back on itself, as indicated at 35 in FIG. 5, to produce a reinforced double-thickness edge. A further feature of the invention is the concept of bending the outer marginal portion 35 to a slight angle along a longitudinal line to form a longitudinal reinforcement ridge 36. Because of the resiliency of the sheet metal employed for the jacket 15, the ridge 36 tends resiliently to maintain its initial configuration, but the bent portion of the sheet will yield in response to tightening of the bands 20. By virtue of this arrangement, the outer, overlapping, bent marginal portions 34 of the sheet metal are stressed by the tightening of the bands and thus serve to keep the bands under tension permanently. A further advantage is that the reinforced or double-thickness edges of the overlapping margins of the sheet metal make line contact with the underlying metal, with consequent concentrated pressure against the underlying metal for sealing action. The stiffening of the outer overlapping marginal portion by the double thickness of the metal and by the provision of the reinforcing ridge 36 makes it possible to space the tension bands 20 relatively far apart without loss in sealing effectiveness.

The adjacent end edges of the successive sheets that make up the jacket 15 overlap to provide tight joints. Thus, FIG. 2 shows an end marginal portion of a jacket sheet 15a overlapping the end marginal portion of the adjacent jacket sheet 15b. At each of these end-to-end joints, a tension band 20 tightly encircles the jacket 15, as indicated in FIG. 2. Usually, tension bands 20 also encircle at least one intermediate region of each of the jacket sheets. If 36 inch jacket sheets are used, for example, there may be two bands at intermediate points, as shown in FIG. 1, in addition to the bands at the end joints, the bands being spaced apart approximately 12 inches center-to-center.

Since the soft lower insulating material 14 is not form-retaining, and, therefore, has no appreciable reinforcing effect on the jacket 15, suitable radial reinforcing elements 40 are added on the underside of the structure, each of the elements extending inwardly from the jacket 15 to the periphery of the pipe 10 to maintain the desired radial spacing between the jacket and the pipe. As best shown in FIG. 3, each radial spacer element 40 may be a metal strap bent to V-form and having end flanges 42 by means of which it may be spot welded to the inner side of the jacket 15, as indicated at 44.

It is contemplated that the radial spacers 40 will be positioned in circumferentially extending rows in the region of the lower soft insulating material 14, with the various rows corresponding to the various tension straps 20 and with each of the rows positioned directly radially inwardly from the corresponding strap 20 to resist the tensioning of the strap. Thus, FIG. 1 shows how three radial spacers 40 may be positioned to register with each tension band 20 in the region of the lower yielding insulating material 14, the radial spacers extending through the insulating material into contact with the pipe 10.

In the preferred practice of the invention, the described structure is largely prefabricated and requires relatively little field labor to complete an insulation in an expeditious manner. Each of the jacket sheets is processed in the shop, being rolled to cylindrical configuration and formed with the double-thickness edge and with the reinforcing ridge 36. The rows of radial spacers 40 are spot welded to the inner side of the sheet and the lower yielding insulating material 14 is bonded to the inner surface of the jacket sheet with the radial spacers 40 extending through the insulating material. The tension bands 20 are also cut to length in the shop.

The installation procedure in the field consists simply of placing the preformed insulating slabs 12 along the upper surface of the pipe 10 and then wrapping the jacket sheet assemblies around both the pipe and the insulating slabs 12 to position the various components of the structure in the manner shown in FIG. 1. The tension bands 20 are then applied and tightened to complete the installation.

The preformed blocks 12 are of sufficient strength to maintain the initial cylindrical configuration of the upper portion of the jacket 15 in opposition to any loads or impact forces that may be applied to the upper side of the jacket under ordinary conditions throughout the indefinite service life of the installation. Thus, tools and other objects may be dropped against the upper surface of the jacket and a man may walk along the upper surface of the jacket without any significant damage to the structure.

The slabs 12 are more expensive per area of coverage than the soft yielding insulating material 14 and are not quite of the same insulating efficiency. The insulation efficiency of the slabs 12 is quite high, however, and the increased cost is worth while, not only because the slabs are so effective in reinforcing the upper side of the jacket 15, but also because the cost of the slabs 12 is more than offset by economies that are made possible by the slabs. One economy is that with the jacket supported by the slabs 12, the jacket 15 may be made of relatively light-gauge material. Thus, where 24-gauge galvanized sheets would be required for enclosing softer insulating material, the described construction characterized by the use of the high strength slabs 12 makes it possible to use only 28-gauge sheet material.

A further economy that is made possible by the use of the upper slabs 12 resides in the relatively inexpensive soft insulating material 14 for the underside of the pipe. With the upper portion of the jacket 15 adequately reinforced, supported and held to shape by the upper insulating slabs 12, the lower portion of the sheet metal jacket has a natural tendency to assume a cylindrical form and this lower portion is naturally protected from the usual loads and impact forces. It is merely necessary to add the radial spacers 40 to reinforce the tendency of the lower portion of the jacket to maintain the cylindrical configuration that is provided by the upper slabs 12. The radial spacers 40 lower the insulating effectiveness of the soft, yielding insulating material 14, but only to a minor degree and the net insulating efficiency on the lower side of the pipe 10 still considerably exceeds the insulating efficiency that is provided on the upper side of the pipe by the slabs 12.

An important feature of the invention is the use of the adhesive layer 16 to bond the soft, yielding insulating material 14 to the inner surface of the jacket sheets. The adhesive layer serves two purposes in that it holds the soft insulating material 14 in position on the prefabricated sheet assembly and in that it serves in the final installation to prevent any gravitational shifting of the soft insulating material.

By reason of all of these factors, the invention provides an insulating construction that is not only of pleasing appearance, but is also durable in efficiency and configuration. The structure has sufficient strength to meet all conditions that may be normally expected and yet is economical in final cost, being much less expensive than a similar construction using only preformed slabs.

If the invention is to be used to insulate a pipe or receptacle containing a refrigerated fluid instead of a heated fluid, a structure may be used such as shown in FIGS. 6 and 7. A vapor barrier is added in the form of a sealed airtight sleeve 50. The moisture barrier 50, which may be a laminated sheet of paper and metal foil, encases the insulating material that surrounds the pipe 10 and is bonded to the adjacent inner surface of the jacket 15c by a layer 52 of suitable adhesive material. The adhesive layer 52 should, of course, be waterproof and rubber cement may be employed for this purpose.

The upper slabs 12a of foam-retaining insulating material in FIG. 6 may be made of vegetable cork or foam glass or any other suitable material. The lower softer insulating material 14a may be felted fibrous glass, organic fiber or any other suitable soft insulating material. The sheet material of the jacket 15c in FIG. 6 may be of any suitable material, but, preferably, is made of metal sheet material having a highly reflective surface.

In this second embodiment of the invention, the previously described metal radial spacers 40 are replaced by small radially positioned blocks 40a of foam-retaining insulating material, for example, the same material as the upper slabs 12a. The spacer blocks 40a are bonded to the vapor-proof sleeve 50 by an adhesive layer 54, as indicated in FIG. 7, which, in turn, is bonded to the jacket 15c. Since the envelope 50 is, in turn, bonded to the jacket 15c, it is apparent that the spacer blocks are, in effect, bonded to the jacket. The spacer blocks 40a may be cut from the slabs 12a.

My description in specific detail of the selected embodiments of the invention will suggest to those skilled in the art various changes, substitutions and other departures from my disclosure within the spirit and scope of the appended claims. Thus, in some practices of the invention, the radial spacers 40 may be omitted, and in some practices, the lower insulating material 14 and 14a may be simply loose fibrous or granular material packed into the annular space between the pipe and the outer jacket. These particular departures from the preferred practice have obvious disadvantages, however.

I claim as my invention:

1. In an insulating structure for a substantially horizontal hollow cylindrical body, the combination of: an outer substantially cylindrical jacket of thin sheet material; preformed insulating slabs on the upper side of the cylindrical body conforming to the outside curvature of the cylindrical body and the inside curvature of the jacket, said slabs being form-retaining and capable of withstanding compressive loads of several pounds per square inch, whereby the slabs support and reinforce the upper portion of the jacket to resist external forces imposed thereon; a porous insulating mass of substantially less compressive resistance occupying the remaining annular space between the cylindrical body and the jacket; a plurality of radial spacer elements at spaced points on the lower side of the cylindrical body extending from the surface of the cylindrical body to the jacket to support and reinforce the lower portion of the jacket; and a plurality of axially spaced circumferential tension members encircling said jacket to hold the jacket against said upper slabs and to hold said spacers against the cylindrical body.

2. In an insulating structure for a substantially horizontal hollow cylindrical body, the combination of: an outer substantially cylindrical jacket of thin sheet material; preformed insulating slabs on the upper side of the cylindrical body conforming to the outside curvature of the cylindrical body and the inside curvature of the jacket, said slabs being form-retaining and capable of withstanding compressive loads of several pounds per square inch, whereby the slabs support and reinforce the upper portion of the jacket to resist external forces imposed thereon; a porous insulating mass of relatively soft material having a compression resistance of less than one pound per square inch and occupying the remaining annular space between the cylindrical body and the jacket; and a plurality of axially spaced circumferential tension members encircling said jacket to hold the jacket against said upper slabs and said porous insulating mass.

3. In an insulating structure for a substantially horizontal hollow cylindrical body, the combination of: a plurality of cylindrically formed sheets of thin waterproof material forming an outer jacket for said cylindrical body of substantially larger diameter than the cylindrical body to define therewith an annular insulation space around the cylindrical body, said sheets being positioned end-to-end with their adjacent ends overlapping to permit relative longitudinal movements of the sheets for accommodating longitudinal thermal expansion and contraction of the cylindrical body, the longitudinal margins of said sheets overlapping to permit diametrical expansion and contraction of said annular space with diametrical thermal expansion and contraction of the cylindrical body, the outer overlapping longitudinal marginal portions of said sheets extending downward to drain surface moisture away from the interior of the jacket; preformed insulating slabs on the upper side of the cylindrical body conforming to the outside curvature of the cylindrical body and the inside curvature of the jacket, said slabs being form-retaining and capable of withstanding compressive loads of several pounds per square inch, whereby the slabs support and reinforce the upper portion of the jacket to resist external forces imposed thereon; a porous insulating mass of substantially less compressive resistance occupying the remaining annular space between the cylindrical body and the jacket; circumferential tension members encircling the overlapping end portions of said sheets to hold the overlapping end portions in close mutual contact at the junctures of the sheets; at least one additional tension member encircling each of said sheets at a point intermediate its length to cooperate with the first-mentioned tension members to hold the overlapping marginal portions of the sheets in close mutual contact; and a series of radial spacers corresponding to each of said tension members and extending from the jacket through said porous mass to said cylindrical body, each of said series being positioned directly radially inwardly of the corresponding tension member with the individual spacer elements of the series attached to the jacket and distributed circumferentially to reinforce the lower portion of the jacket.

4. A combination as set forth in claim 3, in which said insulating mass is bonded to the inner surfaces of said sheets and said spacer elements are bonded to the sheets, whereby the placing of the sheets around the cylindrical body assembles the material of the insulating mass and the radial spacers into their final positions in contact with the cylindrical body.

5. A combination as set forth in claim 3, in which the outer longitudinal marginal portion of each of said sheets is bent inwardly along a longitudinal line, thereby forming a longitudinal stiffening ridge with consequent concentration of the pressure contact between the overlapping marginal portions at the edge of the outer marginal portions.

6. A combination as set forth in claim 5, in which said outer marginal portion of each sheet is bent back on itself to provide a stiffened double-thickness edge for pressure contact against the underlying marginal portion of the sheet.

7. In an insulation structure for a substantially horizontal hollow cylindrical body, the combination of: a plurality of cylindrically formed sheets of thin waterproofing material forming an outer jacket for said cylindrical body of substantially larger diameter than the cylindrical body to define therewith an annular insulation space around the cylindrical body, said sheets being positioned end-to-end with their adjacent ends overlapping to permit relative longitudinal movements of the sheets of accommodating longitudinal thermal expansion and contraction of the cylindrical body, the longitudinal margins of said sheets overlapping to permit diametrical expansion and contraction of said annular space with diametrical thermal expansion and contraction of the cylindrical body, the outer overlapping longitudinal marginal portions of said sheets extending downward to drain surface moisture away from the interior of the jacket; preformed insulating slabs on the upper side of the cylindrical body conforming to the outside curvature of the cylindrical body and the inside curvature of the jacket, said slabs being form-retaining and capable of withstanding compressive loads of several pounds per square inch, whereby the slabs support and reinforce the upper portion of the jacket to resist external forces imposed thereon; a porous insulating mass of substantially less compressive resistance occupying the remaining annular space between the cylindrical body and the jacket; circumferential tension members encircling the overlapping end portions of said sheets to hold the overlapping end portions in close mutual contact at the junctures of the sheets; at least one additional tension member encircling each of said sheets at a point intermediate its length to cooperate with the first-mentioned tension members to hold the overlapping marginal portions of the sheets in close mutual contact; a flexible envelope of airtight, waterproof material lining said jacket and bonded thereto, said envelope sealing said annular space against the intrusion of air and moisture; and a series of radial spacers corresponding to each of said tension members and extending through said porous mass to said cylindrical body, each of said series being positioned directly radially inwardly of the corresponding tension member with the individual spacer elements of the series bonded to said envelope and distributed circumferentially to reinforce the lower portion of the jacket.

8. A combination as set forth in claim 7, in which said spacers are blocks of form-retaining material having a compressive strength of several pounds per square inch.

9. A method of insulating a substantially horizontal hollow cylindrical body against heat transfer relative to the surrounding atmosphere, comprising: bonding a thick layer of flexible porous insulating material of low compressive strength to a first longitudinal portion of the surface of a flexible weatherproof sheet, leaving a second adjacent longitudinal portion of the area of the sheet clear; attaching radial spacer elements to said first portion of the sheet with the spacer elements extending through said layer of porous insulating material; placing on the upper side of the cylindrical body at least one preformed insulating slab of relatively high compressive strength, said slab being of the shape of a segment of a cylinder conforming to the curvature of the cylindrical body, the area of the outer surface of said slab corresponding at least approximately to the area of said second portion of said sheet; and wrapping the securing said sheet around the cylindrical body with said second portion of the sheet covering said slab and with said first portion of the sheet extending under the cylindrical body with said porous flexible material meeting the opposite longitudinal edges of the slab and with said spacer elements in contact with the cylindrical body.

10. A method of insulating a substantially horizontal hollow cylindrical body against heat transfer relative to the surrounding atmosphere, comprising: bonding a thick layer of flexible porous insulating material of low compressive strength to a first longitudinal portion of the surface of a flexible weatherproof sheet, leaving a second adjacent longitudinal portion of the area of the sheet clear; placing on the upper side of the cylindrical body at least one preformed insulating slab of relatively high compressive strength, said slab being of the shape of a segment of a cylinder conforming to the curvature of the cylindrical body, the area of the outer surface of said slab corresponding at least approximately to the area of said second portion of said sheet; wrapping said sheet around the cylindrical body with said second portion of the sheet covering said slab and with said first portion of the sheet extending under the cylindrical body with said porous flexible material meeting the opposite longitudinal edges of the slab; and placing a plurality of tension members around said sheet.

11. A method of insulating a substantially horizontal hollow cylindrical body against heat transfer relative to the surrounding atmosphere, comprising: bonding a thick layer of flexible porous insulating material of low compressive strength to a first longitudinal portion of the surface of a flexible weatherproof sheet, leaving a second adjacent longitudinal portion of the area of the sheet clear; attaching a plurality of spaced laterally extending rows of radial spacer elements to said first portion of the surface of the sheet with the spacer elements extending through said layer of porous insulating material; placing on the upper side of the sheet at least one preformed insulating slab of relatively high compressive strength, said slab being of the shape of a segment of a cylinder conforming to the curvature of the cylindrical body, the area of the outer surface of said slab corresponding at least approximately to the area of said second portion of said sheet; wrapping said sheet around the cylindrical body with said second portion of the sheet covering said slab and with said first portion of the sheet extending under the cylindrical body with said porous flexible material meeting the opposite longitudinal edges of the slab; and placing a plurality of tension members around said sheet corresponding to and registering with said plurality of rows of said radial spacer elements to be held outward from the cylindrical body by the spacer elements.

12. A method of insulating a substantially horizontal hollow cylindrical body against heat transfer relative to the surrounding atmosphere, comprising: bonding a thick layer of flexible porous insulating material of low compressive strength to a first longitudinal portion of the surface of a resiliently flexible metal sheet, leaving a second adjacent longitudinal portion of the area of the metal sheet clear; bending slightly a longitudinal marginal portion of said sheet; attaching radial spacer elements to said first portion of the metal sheet with the spacer elements extending through said layer of porous insulating material; placing on the upper side of the cylindrical body at least one preformed insulating slab of relatively high compressive strength, said slab being of the shape of a segment of a cylinder conforming to the curvature of the cylindrical body, the area of the outer surface of said slab corresponding at least approximately to the area of said second portion of said sheet; wrapping said metal sheet around the cylindrical body with said second portion of the sheet covering said slab and with said first portion of the sheet extending under the cylindrical body with said porous flexible material meeting the opposite longitudinal edges of the slab and with said bent longitudinal marginal portion of the metal sheet overlapping the opposite longitudinal marginal portion in the region of said slab whereby the overlapping bent marginal portion yieldingly resists radial compression forces against the slab; placing a plurality of tension members around said sheet registering with said radial spacer elements; and tensioning said tension members in opposition to the yielding resistance of said overlapping bent portion to place the tension members under permanent tension.

References Cited in the file of this patent

UNITED STATES PATENTS

| | | |
|---|---|---|
| 1,317,957 | Carroll | Oct. 7, 1919 |
| 1,513,723 | Bohlander | Oct. 28, 1924 |
| 1,613,725 | Sabin | Jan. 11, 1927 |
| 1,735,684 | Judgensen | Nov. 12, 1929 |
| 1,762,276 | Schreier | June 10, 1930 |
| 1,825,424 | Russell et al. | Sept. 29, 1931 |
| 1,895,420 | Mottweiler | Jan. 24, 1933 |
| 1,929,817 | Helsing | Oct. 10, 1933 |
| 2,331,146 | Slayter | Oct. 5, 1943 |
| 2,460,848 | Rover | Feb. 8, 1949 |
| 2,674,335 | Lemmerman | Apr. 6, 1954 |

FOREIGN PATENTS

| | | |
|---|---|---|
| 556,351 | Great Britain | Sept. 30, 1943 |
| 643,792 | Great Britain | Sept. 27, 1950 |